US012316030B1

(12) United States Patent
Iino

(10) Patent No.: US 12,316,030 B1
(45) Date of Patent: May 27, 2025

(54) LOW-PROFILE COMPOSITE ANTENNA DEVICE

(71) Applicant: HARADA INDUSTRY CO., LTD., Tokyo (JP)

(72) Inventor: Shinji Iino, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/850,869

(22) PCT Filed: Mar. 10, 2023

(86) PCT No.: PCT/JP2023/009213
§ 371 (c)(1),
(2) Date: Dec. 26, 2024

(87) PCT Pub. No.: WO2023/181978
PCT Pub. Date: Sep. 28, 2023

(30) Foreign Application Priority Data

Mar. 25, 2022 (JP) ................................ 2022-050668

(51) Int. Cl.
*H01Q 1/32* (2006.01)
*H01Q 9/04* (2006.01)

(52) U.S. Cl.
CPC ......... *H01Q 9/0407* (2013.01); *H01Q 1/3275* (2013.01)

(58) Field of Classification Search
CPC ...... H01Q 9/0407; H01Q 1/3275; H01Q 1/32; H01Q 1/12; H01Q 1/1214; H01Q 1/38; H01Q 1/521; H01Q 19/22
See application file for complete search history.

(56) References Cited

U.S. PATENT DOCUMENTS

| | | | | |
|---|---|---|---|---|
| 2012/0026050 | A1 | 2/2012 | Sampo et al. | |
| 2018/0212301 | A1* | 7/2018 | Iino | H01Q 21/30 |
| 2019/0280372 | A1* | 9/2019 | Terashita | H01Q 1/22 |
| 2021/0273320 | A1 | 9/2021 | Yokota et al. | |

FOREIGN PATENT DOCUMENTS

| | | | |
|---|---|---|---|
| JP | 2012-034226 | A | 2/2012 |
| JP | 2018-121143 | A | 8/2018 |
| WO | 2018105235 | A1 | 6/2018 |
| WO | 2020004612 | A1 | 1/2020 |

OTHER PUBLICATIONS

International Search Report in PCT/JP2023/009213, dated May 16, 2023.

* cited by examiner

*Primary Examiner* — David E Lotter
(74) *Attorney, Agent, or Firm* — Global IP Counselors, LLP

(57) ABSTRACT

A low-profile composite antenna device includes a base plate, a first antenna, and a second antenna. The first antenna has a patch electrode capable of receiving signals in a first frequency band. The second antenna, which is capable of receiving signals in a second frequency band, has a top load part as a capacitive element. The top load part is disposed near the patch electrode of the first antenna such that it does not cover the patch electrode in a top view and that the patch electrode is located on the longitudinal extension axis of the top load part. The second antenna has at least one stub that electrically divides the longitudinal direction of the top load part into front and rear sections so as to function as a waveguide for the first antenna.

8 Claims, 4 Drawing Sheets

LOW-PROFILE COMPOSITE ANTENNA DEVICE

CROSS-REFERENCE TO RELATED APPLICATIONS

This application is a U.S. national stage application of International Application No. PCT/JP2023/009213, filed on Mar. 10, 2023. This application claims priority to Japanese Patent Application No. 2022-050668, filed on Mar. 25, 2022.

BACKGROUND

Technical Field

The present invention relates to a low-profile composite antenna device, and more particularly to a low-profile composite antenna device for vehicles capable of receiving signals in a plurality of frequency bands.

Background Information

As vehicle antenna devices, those capable of receiving AM and FM broadcasts are generally used. There are available several types of the vehicle antenna device, such as a rod antenna, a film antenna, and a glass antenna. Recently, there is also available so-called a shark-fin antenna which is an antenna device with small size and low-profile. As to an antenna length, a rod antenna or the like is designed so as to have a length of ¼ wavelength of an FM broadcast frequency band. Further, in the vehicle antenna device, an antenna height, i.e., a length protruding from a vehicle roof is restricted by regulations for exterior fittings, and thus there exists a helical antenna in which an antenna element is wound helically to reduce the length thereof. However, in an AM broadcast frequency band, the antenna length is far shorter than the wavelength, with the result that the receiving sensitivity is significantly deteriorated. Therefore, there has been developed a shark-fin type low-profile antenna device capable of being used as an AM/FM element by attaching a metal top load part to the open-end side of the antenna element and constituting it as a capacitive antenna with capacitance.

For example, JP 2012-034226A discloses a low-profile composite antenna device in which a patch antenna is combined with such a low-profile antenna device to enable reception of signals in a plurality of frequency bands. The low-profile antenna device disclosed in JP 2012-034226A is designed such that the width direction dimension of a capacitive plate functioning as an AM/FM element is approximately ¼ wavelength or less of the reception frequency of a patch antenna disposed below the AM/FM element, and it is made as meanders in the length direction. Since the polarized wave component in the length direction of the capacitive plate in the received wave of the patch antenna is perpendicular to the line arranged approximately parallel to the width direction, it hardly affects the antenna characteristics of the patch antenna.

However, the low-profile composite antenna device disclosed in JP 2012-034226A has a complicated shape due to presence of the meander-shaped capacitive plate and may be deformed during assembly, and is thus not easy to assemble and difficult to produce at low cost.

As a solution to such problems, there is also known JP 2018-121143A disclosed by the same applicant as the present applicant. JP 2018-121143A discloses a low-profile composite antenna device including a patch antenna and an AM/FM element having a top load part arranged to cover the patch antenna and having a conductive surface state that also functions as a wave guide for the patch antenna.

SUMMARY

In recent years, it has become desirable to further reduce the height of vehicle antenna devices. Regarding the top load part as those described in Patent Documents 1 and 2, it is necessary to ensure a sufficient height from the base plate in order to improve performance. However, when the height of the top load part is lowered in order to achieve a lower profile, antenna reception characteristics of the AM/FM element may deteriorate due to capacitive coupling with the patch antenna.

Furthermore, conventional GNSS (Global Navigation Satellite System) uses carrier waves of L1 signals. However, in recent years, so-called multi-band GNSS has become popular, and L5 signals are also being used. Since the L1 and L5 signals have separate bands, a patch antenna that supports two frequencies is generally used. Specifically, the two-frequency patch antenna is a stacked patch antenna in which an L1 signal patch antenna is stacked on an L5 signal patch antenna and thus requires a certain height. On the other hand, the top load part as those described in Patent Documents 1 and 2 requires a sufficient height from the base plate in order to improve performance as described above; however, it is sometimes difficult to fit the top load part above a stacked patch antenna having a certain height so as to cover the same. Therefore, it has been desired to develop a low-profile composite antenna device that improves the antenna reception characteristics of a patch antenna even with a lower-profile housing spatially restricted in the height direction.

The present invention has been made in view of the above situation, and an object thereof is to provide a low-profile composite antenna device having improved antenna reception characteristics of a patch antenna even with a low-profile housing spatially restricted in the height direction.

To achieve the above object of the present invention, a low-profile composite antenna device according to the present invention may include: a base plate fixed to a vehicle; a first antenna placed on the base plate and having a patch electrode capable of receiving signals in a first frequency band; and a second antenna being capable of receiving signals in a second frequency band lower than the first frequency band, in which the second antenna has a top load part as a capacitive element disposed at an interval in the height direction from the base plate, the top load part being disposed near the patch electrode of the first antenna such that it does not cover the patch electrode of the first antenna and that the patch electrode is located on an extension axis of a longitudinal direction of the top load part, and having at least a stub that electrically divides the longitudinal direction of the top load part into front and rear sections so as to function as a waveguide for the first antenna.

In the second antenna, the top load part may include a ridgeline part extending in the longitudinal direction thereof and side surface parts extending from both sides of the ridgeline part, and the stub may include two first slits extending in parallel from a lower end of one side surface part to a middle of an other side surface part through the ridgeline part and a second slit extending in parallel to the first slits from the lower end of the other side surface part to the middle between the two first slits.

In the second antenna, the top load part may include a ridgeline part extending in the longitudinal direction thereof and side surface parts extending from both sides of the ridgeline part, and the stub may include a wide slit extending from a lower end of one side surface part toward the ridgeline part, two first slits extending in parallel from both ends of a deepest portion of the wide slit to a middle of an other side surface part, and a second slit extending parallel to the two first slits from the lower end of the other side surface part to the middle between the two first slits.

In the second antenna, the stub may be disposed at a position away, by a predetermined distance, from an end portion of the patch electrode side of the longitudinal direction of the top load part or from an end portion opposite to the patch electrode side so that the signal reception characteristics of the first antenna are maximized.

In the second antenna, the predetermined distance, by which the stub is disposed at a position away, from the end portion of the patch electrode side of the longitudinal direction of the top load part or from the side opposite to the patch electrode side, may be two to three times as large as the dimensions of the patch electrodes of the first antenna.

The first antenna may be a GNSS L1 frequency band antenna.

The first antenna may include a GNSS L1 frequency band antenna and a GNSS L5 frequency band antenna.

The second antenna may further include a coil having one end connected to the top load part and is configured such that the top load part functions as an AM antenna and that the top load part and the coil function as an FM antenna.

The low-profile antenna device according to the present invention is advantageous in that it can improve the antenna reception characteristics of the patch antenna even with a low-profile housing spatially restricted in the height direction due to arrangement of the top load part at a position not covering the patch antenna in a top view. Further, since the patch antenna is not disposed below the top load part, the performance of the top load part is improved.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1A:
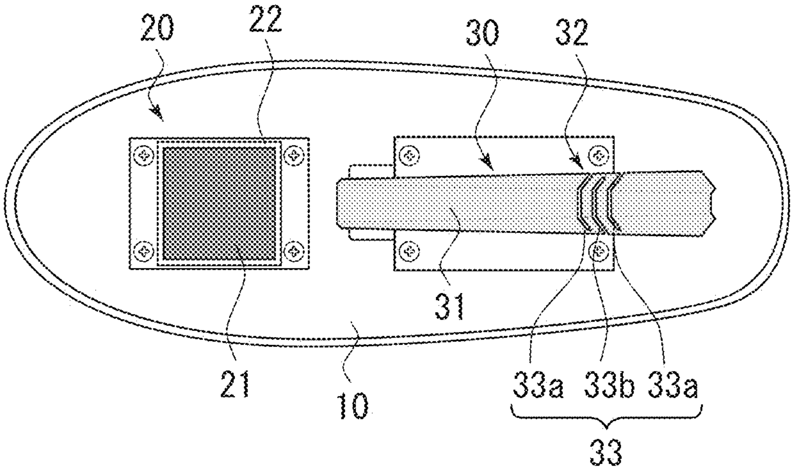
FIG. 1 is a schematic view for explaining a low-profile composite antenna device according to an illustrated embodiment.
Figure 1B:
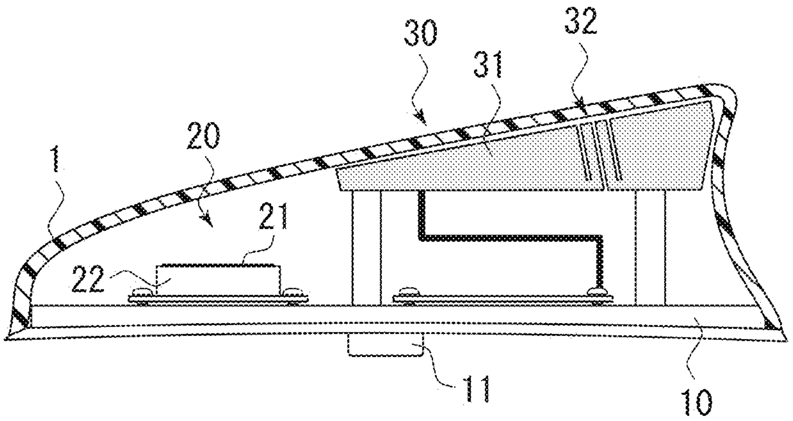

Hereinafter, embodiments for practicing the present invention will be described with illustrated examples. FIG. 1 is a schematic view for explaining a low-profile composite antenna device according to the present invention, with FIG. 1A being a top view and FIG. 1B being a partially sectional side view. The low-profile composite antenna device according to the present invention is capable of receiving signals in a plurality of frequency bands for vehicles and mainly includes a base plate 10, a first antenna 20, and a second antenna 30, as illustrated. The above base plate 10 and first and second antennas 20 and 30 are covered with an antenna cover 1. The antenna cover 1 has an internal space for accommodating elements, circuits, etc., and defines the outer shape of the low-profile composite antenna device. The low-profile composite antenna device according to the present invention may be configured as a composite antenna that is configured by using a capacitive antenna capable of receiving signals in the AM frequency band and a patch antenna for GNSS, SDARS, or the like, in combination.

The base plate 10 is fixed to a vehicle. Specifically, the base plate 10 may be a so-called resin base made of an insulator such as resin, or a so-called metal base made of a conductor such as metal. Further, the base plate 10 may be a composite base of resin and metal. The base plate 10 is provided with a screw boss 11, for example. The screw boss 11 is inserted into a hole formed in the roof or the like of the vehicle, and a nut is fastened from a vehicle cabin side to fix the base plate 10 to the roof or the like so as to sandwich the roof or the like between the nut and the base plate 10. A cable or the like that connects the inside of the vehicle and the antenna device is inserted through the screw boss 11. Further, the base plate 10 is configured to be covered with the antenna cover 1. The internal space of the antenna device may be sealed by fitting between the base plate 10 and the antenna cover 1.

The first antenna 20 is placed on the base plate 10. The first antenna 20 has a patch electrode 21 capable of receiving signals in a first frequency band. The first antenna 20 may be a dielectric patch antenna 22 that uses circularly polarized waves using ceramics or the like, for example. For example, any patch antenna for GNSS such as GPS or GLONASS may be used. Alternatively, an XM antenna for SDARS may be used.

The second antenna 30 is capable of receiving signals in a second frequency band lower than the first frequency band. Specifically, the second antenna 30 may be any AM antenna that has a resonance frequency in the MF band, for example. The second antenna 30 has a top load part 31 as a capacitive element. That is, the top load part 31 is made of a conductive material and functions as a capacitive antenna having a capacitance. The top load part 31 is disposed at an interval in the height direction from the base plate 10. Here, the top load part 31 is disposed such that it does not cover the patch electrode 21 of the first antenna 20 in a top view and that the patch electrode 21 is located on the longitudinal extension axis of the top load part 31. That is, the top load part 31 does not cover the first antenna 20. The top load part 31 has at least one stub 32 that electrically divides the longitudinal direction of the top load part 31 into front and rear sections so as to function as a waveguide for the first antenna 20. The stub 32 is formed by a folded pattern having a plurality of slits 33 provided alternately in the top load part 31 so that the current flows in directions that cancel each other.

Here, in the example illustrated above, the first antenna 20 has one patch antenna. However, the present invention is not limited thereto. In the low-profile composite antenna device according to the present invention, the top load part 31 can be configured so as not to cover the patch electrode 21 of the first antenna 20 in a top view, so that a spatial restriction in the height direction of the first antenna 20 is relaxed. Therefore, the first antenna 20 may be a tall stacked patch antenna.

Figure 2A:
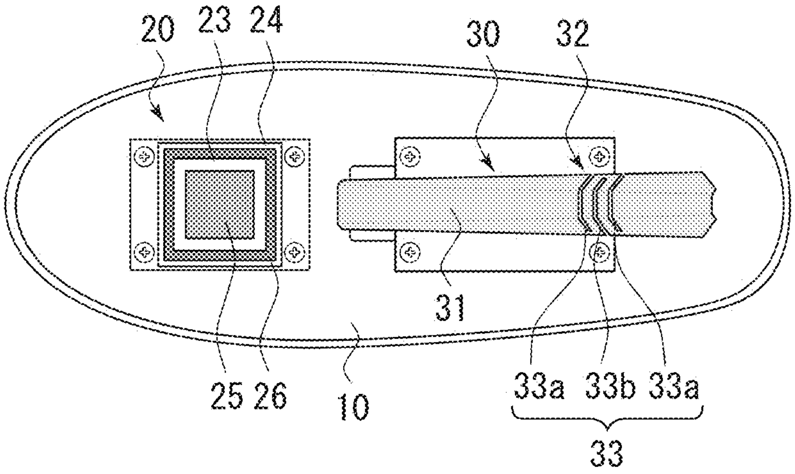
FIG. 2 is a schematic view for explaining a low-profile composite antenna device according to the illustrated embodiment.
Figure 2B:
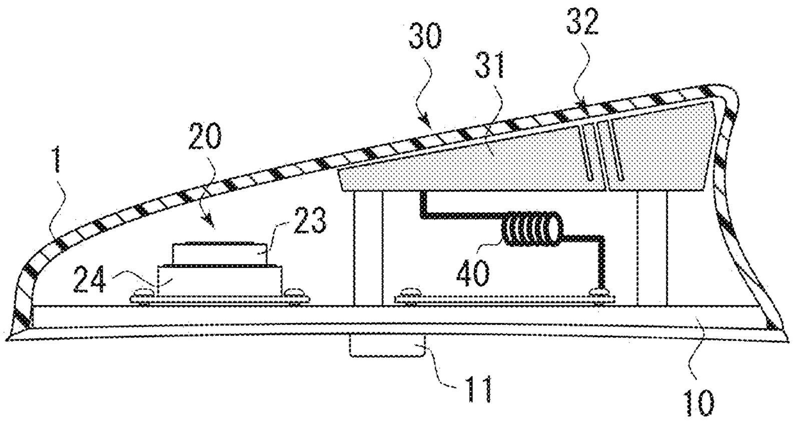

FIG. 2 is a schematic view for explaining another example of the low-profile composite antenna device according to the present invention, with FIG. 2A being a top view and FIG. 2B being a partially sectional side view. In the drawing, the same reference numerals as those in FIG. 1 denote the same parts. In this example, the first antenna 20 is a stacked patch antenna. Specifically, the first antenna 20 includes an L1 signal patch antenna 23 corresponding to the frequency band of the carrier wave of the L1 signal for multi-GNSS, and an L5 signal patch antenna 24 corresponding to the frequency band of the carrier wave of the L5 signal. The first antenna 20 in the illustrated example has the L1 signal patch antenna 23 stacked on the L5 signal patch antenna 24. The stacked patch antenna is a stack of a plurality of patch antennas with different frequency bands. For example, the L1 patch antenna 23 has a patch electrode 25 capable of receiving signals in an L1 frequency band. The L5 patch antenna 24 has a patch electrode 26 capable of receiving signals in an L5 frequency band. Such a patch antenna may be a dielectric patch antenna that uses circularly polarized waves using ceramics, for example, and it may have a stacked configuration of these, or it may be obtained by combining and stacking a dielectric patch antenna and a gap patch antenna.

The first antenna 20 is not limited to one in which a plurality of patch antennas are stacked for multiband support but may be one in which a plurality of patch antennas are arranged on a plane or may be a double annular patch antenna.

The top load part 31 of the second antenna 30 becomes a capacitive antenna in the MF band (AM frequency band), for example, and is thus configured to be able to receive signals in the second frequency band, but the present invention is limited to this. In the low-profile composite antenna device according to the present invention, the second antenna 30 can also be configured as an AM/FM antenna. That is, the second antenna 30 may include a coil 40 connected to the top load part 31 as illustrated in FIG. 2B. One end of the coil 40 is connected to the top load part 31, and the other end thereof is connected to a power feeding part. As a result, in the second antenna 30, the top load part 31 becomes a capacitive antenna and functions as an AM antenna, and the top load part 31 and the coil 40 become a capacitively loaded antenna and function as an FM antenna with a shortened element length.

Figure 3:
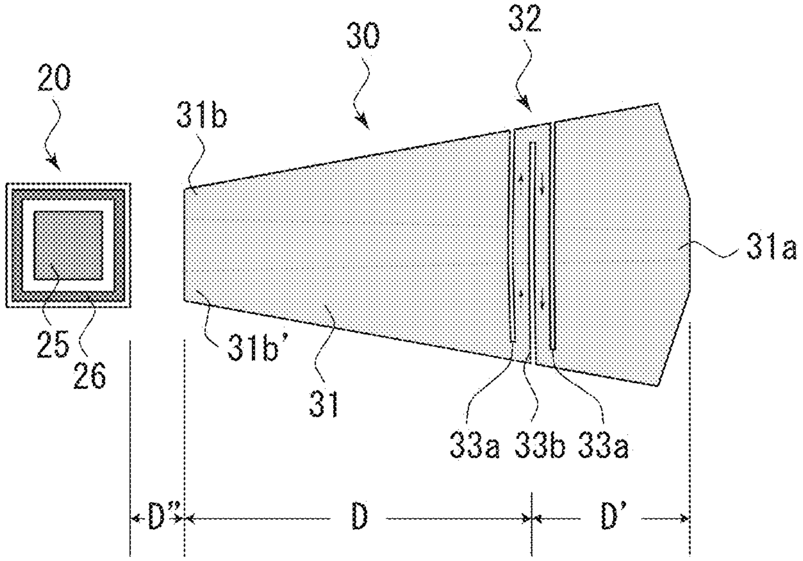
FIG. 3 is a developed view of a top load part of the low-profile composite antenna device according to the illustrated embodiment before being bent.

The details of the top load part of the low-profile composite antenna device according to the present invention will be described using FIG. 3. FIG. 3 is a developed view of the top load part of the low-profile composite antenna device according to the present invention before being bent. In the drawing, the same reference numerals as those in FIG. 1 denote the same parts. Specifically, the top load part 31 of the second antenna 30 is formed into a streamlined shape consisting of a ridgeline part 31*a* extending in the longitudinal direction thereof and side surface parts 31*b* and 31*b*' extending from both sides of the ridgeline part 31*a*. The top load part 31 may be bent to have a shape corresponding to the shape of the antenna cover 1, such as a shark fin shape. The stub 32 formed in the top load part 31 having such a shape includes two first slits 33*a* extending in parallel from the lower end of one side surface part 31*b* to the middle of the other side surface part 31*b*' through the ridgeline part 31*a* and a second slit 33*b* extending in parallel to the first slits 33*a* from the lower end of the other side surface part 31*b*' to the middle between the two first slits 33*a*. By providing the thus configured stub 32 in the middle of the top load part 31, it is possible to electrically divide the top load part 31 into front and rear sections in the longitudinal direction.

The top load part 31 can be easily formed, for example, by cutting out a planar plate-shaped body into a predetermined shape like the illustrated example and bending it into a mountain fold using sheet metal processing or the like. A screw fastening portion may be formed by a notch, a tab, or the like as appropriate.

The stub 32 of the top load part 31 may be arranged at a position away from an end portion of the patch electrodes 25 and 26 side of the longitudinal direction of the top load part 31 by a predetermined distance D so that the signal reception characteristics of the first antenna 20 are improved best. That is, the arrangement position of the stub 32 may be adjusted so that the top load part 31 functions as a waveguide for the first antenna 20. More specifically, the arrangement position of the stub 32 may be determined so that the antenna reception characteristics such as the antenna gain of the first antenna 20 is improved. For example, when the first antenna 20 is a patch antenna for GNSS, the distance D from the end of the top load part 31 on the side of the patch electrodes 25 and 26 to the stub 32 may be two to three times as large as the electrode dimensions of the patch electrodes 25 and 26. That is, in the drawing, the distance D from the left end of the top load part 31 (top load tip) to the stub 32 may be two to three times as large as the electrode dimensions of the patch electrodes 25 and 26. More specifically, for example, when the longitudinal dimension of the top load part 31 is 100 mm, the electrode dimension of the L1 signal patch electrode 25 is 21 mm×21 mm, and the L5 signal patch electrode 26 is 28 mm×28 mm, the distance D from the tip of the top load part 31 to the stub 32 may be about 67 mm.

When the first antenna 20 is a patch antenna with a higher frequency band, such as an MX antenna for SDARS, the stub 32 may be disposed at a position away from an end portion (top load rear end) of the top load part 31 opposite to the patch electrode side by a predetermined distance D'. That is, it is sufficient that the distance D' from the rear end of the top load part 31 to the stub 32 is two to three times as large as the electrode dimension of the patch electrode. In this way, the arrangement position of the stub 32 formed in the second antenna 30 may be adjusted as appropriate depending on the frequency band of the first antenna 20 so that the antenna reception characteristics of the first antenna 20 are improved.

Figure 4:
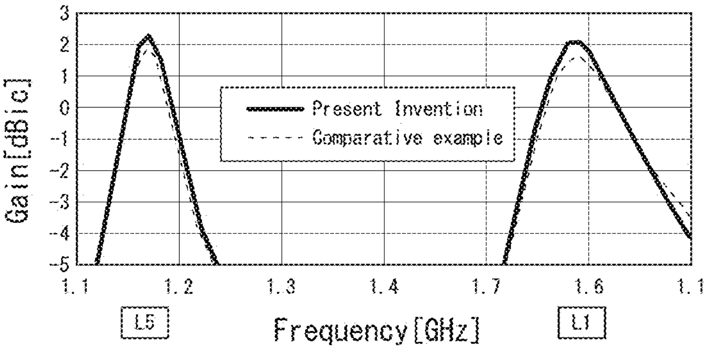
FIG. 4 is a gain change graph of a first antenna for explaining the effect of a stub of the low-profile composite antenna device according to the illustrated embodiment.

Here, an effect of the stub formed in the low-profile composite antenna device of the present invention will be described. FIG. 4 is a gain change graph of the first antenna for explaining the effect of the stub formed in the low-profile composite antenna device according to the present invention. The horizontal axis represents the frequency, and the vertical axis represents the gain of the first antenna. In this graph, the solid curve denotes the gain change of the first antenna 20 of the low-profile composite antenna device according to the present invention illustrated in FIG. 2. Furthermore, as a comparative example, the dashed curve denotes the gain change of the first antenna in the absence of the second antenna 30. As illustrated, when the second antenna 30 including the top load part 31 provided with the stub 32 according to the present invention is used, the gains in the carrier wave frequency bands of both the L1 and L5 signals are improved as compared with when the second antenna 30 is absent.

Figure 5A:
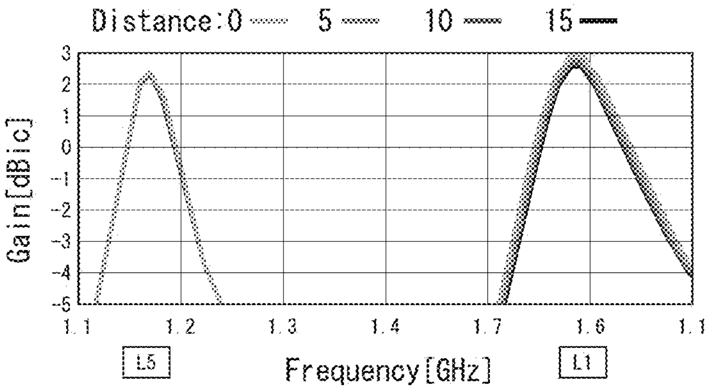
FIG. 5 is a gain change graph of the first antenna for explaining another effect of the stub of the low-profile composite antenna device according to the illustrated embodiment.
Figure 5B:
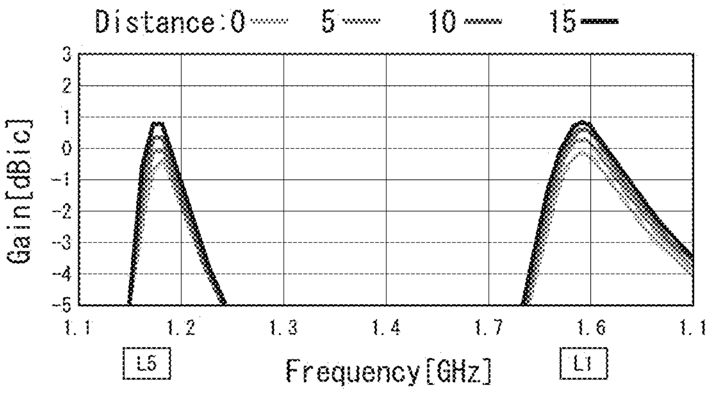

Further, FIG. 5 illustrates gain change graphs of the first antenna for explaining another effect of the stub of the low-profile composite antenna device according to the present invention. The horizontal axis represents the frequency, and the vertical axis represents the gain of the first antenna. FIG. 5A illustrates the gain change graph of the first antenna when the distance between the first and second antennas is changed in the low-profile composite antenna device according to the present invention. FIG. 5B illustrates, as a comparative example, the gain change graph of a stacked patch antenna when the distance between the top load part and the stacked patch antenna free of a stub is changed. The distance between the first and second antennas is represented by D" in FIG. 3. As illustrated, in the case of the low-profile composite antenna device according to the present invention, the second antenna 30 also functions as a waveguide due to the presence of the stub 32, so that there is little change in gain even when the first and second antennas 20 and 30 are brought closer to or farther from each other. This reveals that the degree of freedom in the arrangement of the first and second antennas 20 and 30 is high. On the other hand, in the case of a top load part without the stub, the gain fluctuates significantly with the distance, and the larger the distance is, the higher the gain becomes. In other words, when no stub is present, the antenna reception characteristics of the stacked patch antenna becomes worse as the distance between the first and second antennas 20 and 30 is made closer. This reveals that the degree of freedom in the arrangement is low. It can also be seen that, in the first plane, the gain obtained is higher as a whole in the present invention than in the comparative example.

As described above, in the low-profile composite antenna device according to the present invention, the top load part 31 of the second antenna 30 can be located close to the first antenna 20 while not covering the first antenna 20 in a top view. This makes it possible to improve the antenna reception characteristics of the first antenna 20 even with a low-profile housing spatially restricted in the height direction.

Further, in the low-profile composite antenna device according to the present invention, the first antenna 20, which is a patch antenna, is not disposed below the top load part 31 of the second antenna 30, so that the metal body such as the patch electrode of the first antenna 20 is no longer placed close to and below the top load part 31. Thus, there is no risk of the top load part 31 being coupled to the metal body, and as a result, the antenna reception characteristics of the second antenna 30 is improved. Further, it is possible to suppress the height of the top load part 31 of the second antenna 30, allowing further reduction in height.

Here, in the example illustrated above, the stub 32 of the second antenna 30 extends from the one side surface part 31*b* to the other side surface part 31*b*' through the ridgeline part 31*a*. However, the present invention is not limited to this, and it is sufficient that the stub 32 can electrically divide the longitudinal direction of the top load part 31 into front and rear sections so as to allow the second antenna 30 to also function as a waveguide for the first antenna 20. For example, the stub 32 may be arranged only on the one side surface part, and the other side surface part may be configured to have a wider slit. This will be described in detail below using FIG. 6.

Figure 6:
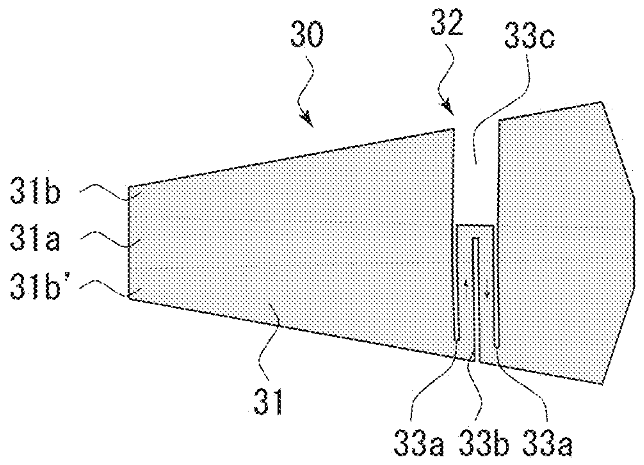
FIG. 6 is a developed view of another example of the stub of the top load part of the low-profile composite antenna device according to the illustrated embodiment before being bent.

FIG. 6 is a developed view of another example of the stub of the top load part of the low-profile composite antenna device according to the present invention before being bent. In the drawing, the same reference numerals as those in FIG. 1 denote the same parts. As illustrated, the top load part 31 includes the ridgeline part 31*a* and side surface parts 31*b* and 31*b*'. The stub 32 includes a wide slit 33*c*, two first slits 33*a*, and a second slit 33*b*. The top load part 31 is made of a flat plate-shaped member before being bent. The top load part 31 is formed by cutting out a planar plate into a predetermined shape as illustrated in FIG. 6 and bending it into a mountain fold at a predetermined position.

The wide slit 33*c* of the stub 32 extends from the lower end of the one side surface part 31*b* toward the ridgeline part 31*a*. The wide slit 33*c* is a slit with a width wide enough to prevent the front and rear sections of the top load part 31 from being strongly coupled but not enough to cause current to flow in directions that cancel each other. The two first slits 33*a* extend in parallel from both ends of the deepest portion of the wide slit 33*c* to the middle of the other side surface part 31*b*'. The second slit 33*b* extends parallel to the first slits 33*a* from the lower end of the other side surface part 31*b*' to the middle between the two first slits 33*a*. That is, the slit of the stub 32 by which current flows in directions that cancel each other may extend only in one side surface, for example.

In this way, the stub 32 of the low-profile composite antenna device according to the present invention need not completely electrically divide the longitudinal direction of the top load part 31 into front and rear sections and may be combined with the wide slit 33*c* as long as it allows the top load part 31 to also function as a waveguide for the first antenna 20.

Further, the top load part 31 in the example illustrated above has a streamlined shape such as a shark fin shape. However, the present invention is not limited to this, and a flat plate-like conductor may be used. That is, a stub dividing the longitudinal direction of a planar plate-shaped body arranged in the horizontal or vertical direction into front and rear sections may be formed at a predetermined position.

The low-profile composite antenna device according to the present invention is not limited to the example illustrated above, and it goes without saying that various changes may be made without departing from the gist of the present invention.

The invention claimed is:

1. A low-profile composite antenna device for vehicle capable of receiving signals in a plurality of frequency bands, the low-profile composite antenna device comprising:

a base plate fixed to a vehicle;

a first antenna placed on the base plate and having a patch electrode capable of receiving signals in a first frequency band; and a second antenna being capable of receiving signals in a second frequency band lower than the first frequency band, in which the second antenna has a top load part as a capacitive element disposed at an interval in the height direction from the base plate, the top load part being disposed near the patch electrode of the first antenna such that it does not cover the patch electrode of the first antenna and that the patch electrode is located on an extension axis of a longitudinal direction of the top load part, and having at least a stub that electrically divides the longitudinal direction of the top load part into front and rear sections so as to function as a waveguide for the first antenna.

2. The low-profile composite antenna device according to claim 1, in which, in the second antenna, the top load part includes a ridgeline part extending in the longitudinal direction thereof and side surface parts extending from both sides of the ridgeline part, and the stub includes two first slits extending in parallel from a lower end of one side surface part to a middle of an other side surface part through the ridgeline part and a second slit extending in parallel to the first slits from the lower end of the other side surface part to the middle between the two first slits.

3. The low-profile composite antenna device according to claim 1, in which, in the second antenna, the top load part includes a ridgeline part extending in the longitudinal direction thereof and side surface parts extending from both sides of the ridgeline part, and the stub includes a wide slit extending from a lower end of one side surface part toward the ridgeline part, two first slits extending in parallel from both ends of a deepest portion of the wide slit to a middle of an other side surface part, and a second slit extending parallel to the two first slits from the lower end of the other side surface part to the middle between the two first slits.

4. The low-profile composite antenna device according to claim 1, in which, in the second antenna, the stub is disposed at a position away, by a predetermined distance, from an end portion of the patch electrode side of the longitudinal direction of the top load part or from an end portion opposite to the patch electrode side so that the signal reception characteristics of the first antenna are maximized.

5. The low-profile composite antenna device according to claim 4, in which, in the second antenna, the predetermined distance, by which the stub is disposed at a position away, from the end portion of the patch electrode side of the longitudinal direction of the top load part or from the side opposite to the patch electrode side, is two to three times as large as the dimensions of the patch electrodes of the first antenna.

6. The low-profile composite antenna device according to claim 1, in which the first antenna is a GNSS L1 frequency band antenna.

7. The low-profile composite antenna device according to claim 1, in which the first antenna includes a GNSS L1 frequency band antenna and a GNSS L5 frequency band antenna.

8. The low-profile composite antenna device according to claim 1, in which the second antenna further includes a coil having one end connected to the top load part and is configured such that the top load part functions as an AM antenna and that the top load part and the coil function as an FM antenna.

* * * * *